Nov. 30, 1965  R. L. SCHWARZ  3,220,087
ENGINE TURNING MACHINE
Filed Aug. 30, 1963  6 Sheets-Sheet 1
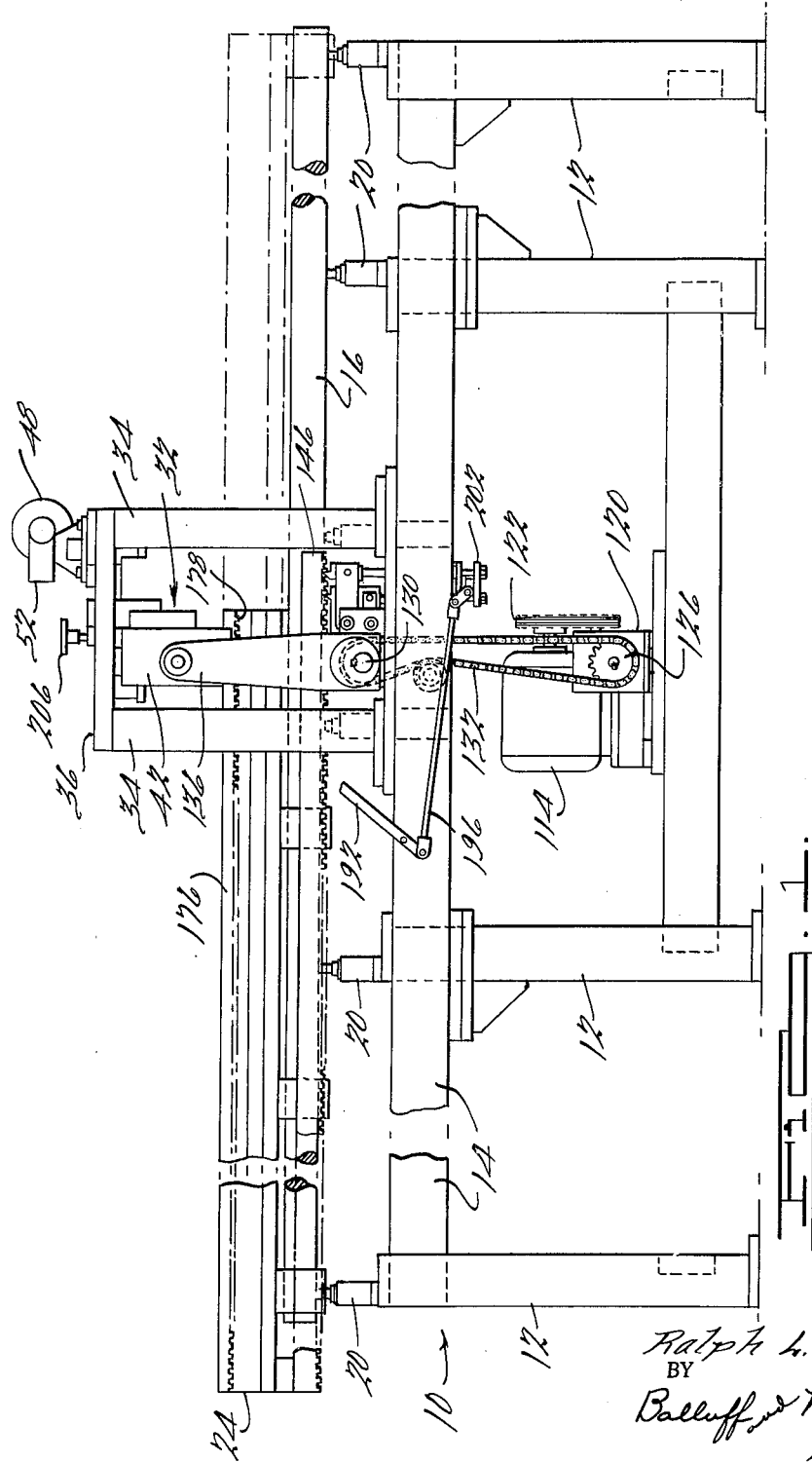
INVENTOR.
Ralph L. Schwarz.
BY
Balluff and McKinley
ATTORNEYS

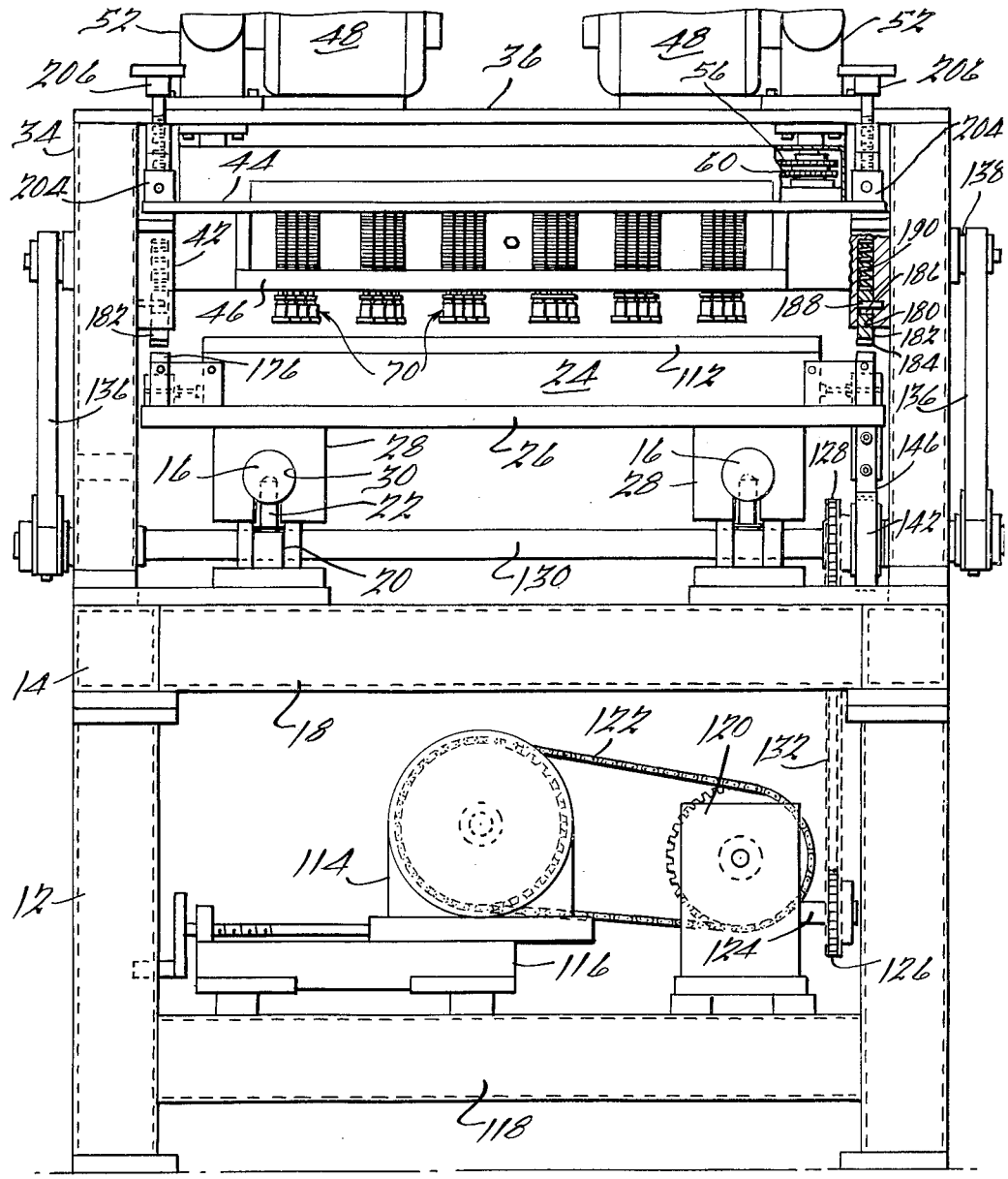

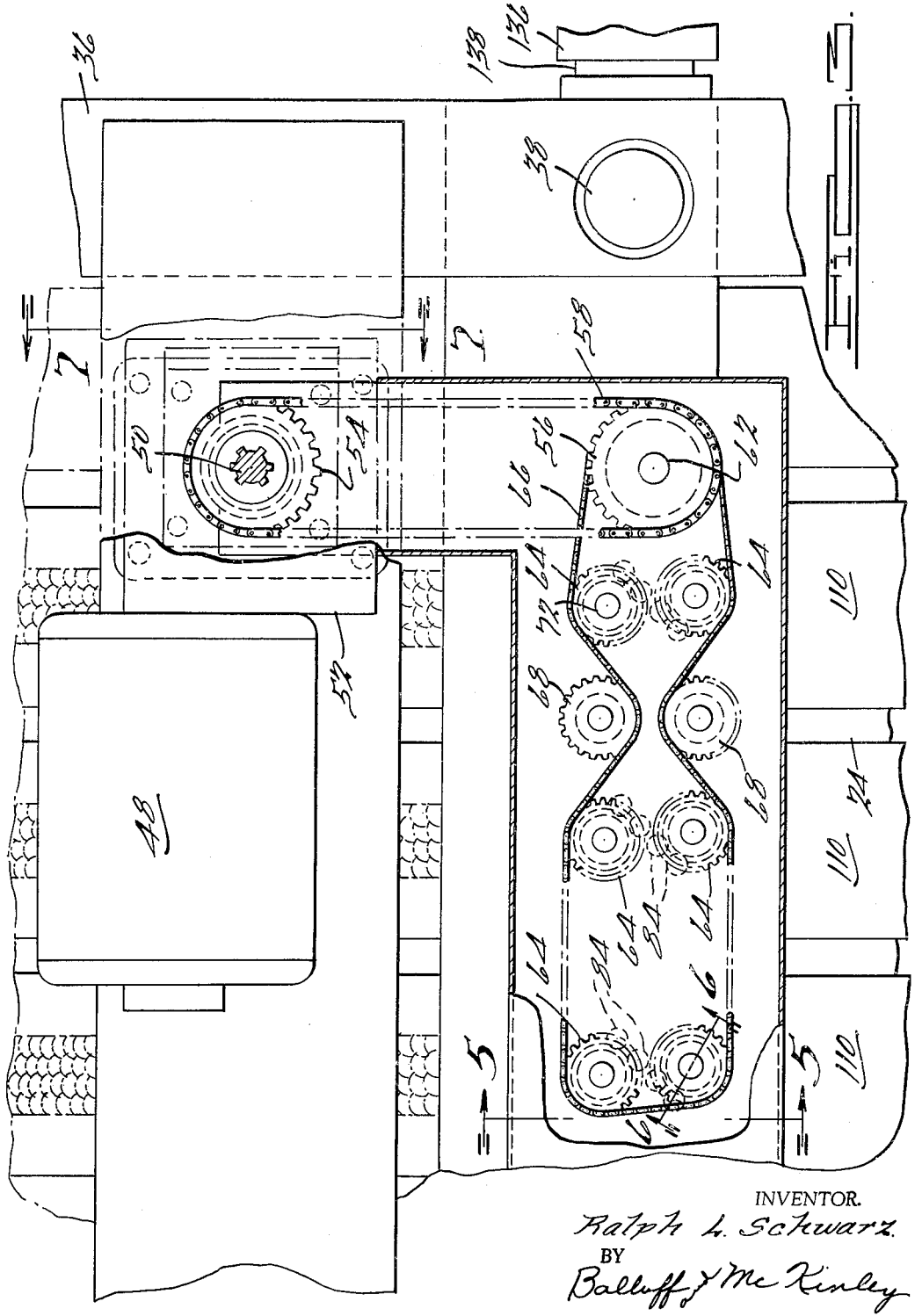

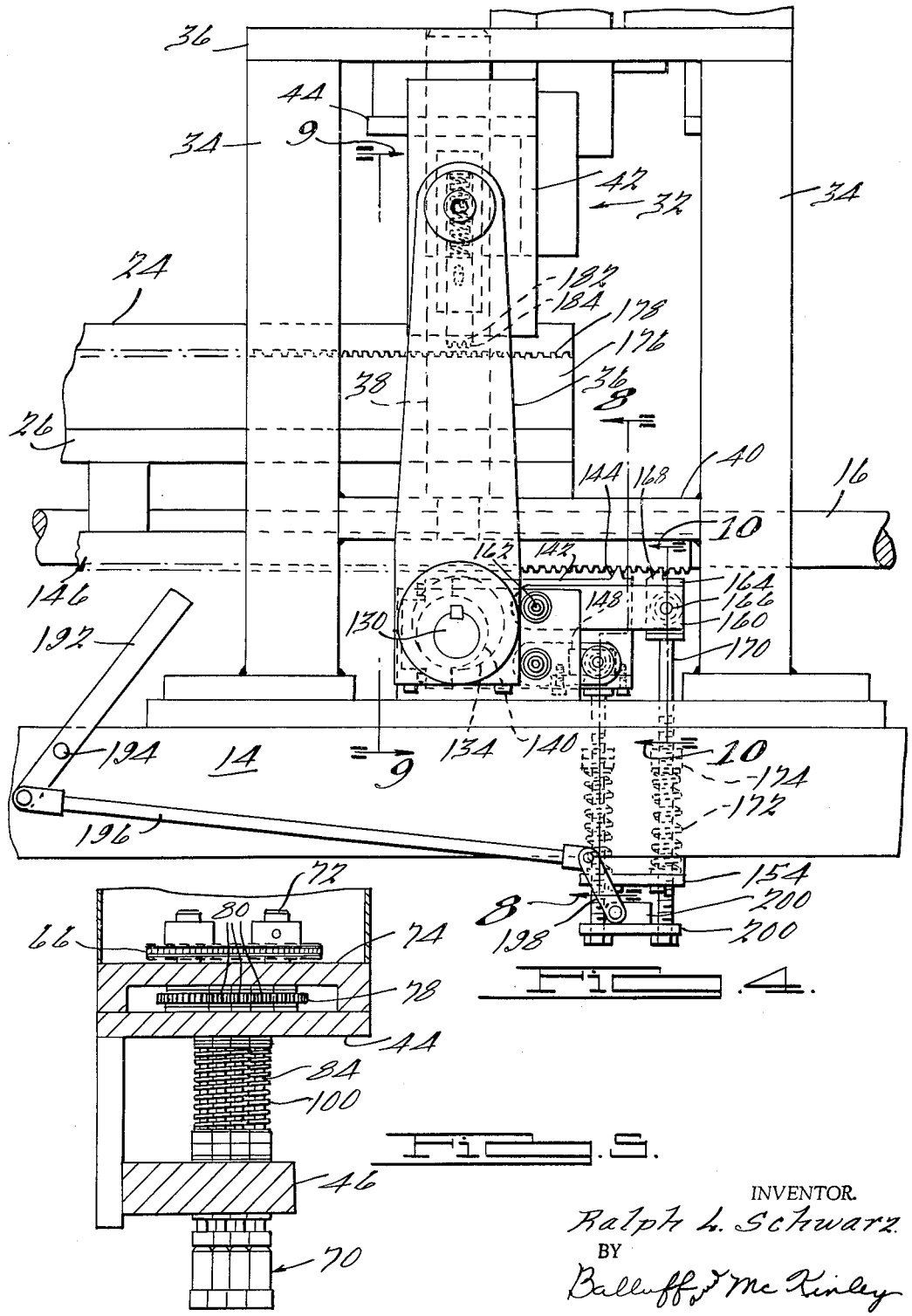

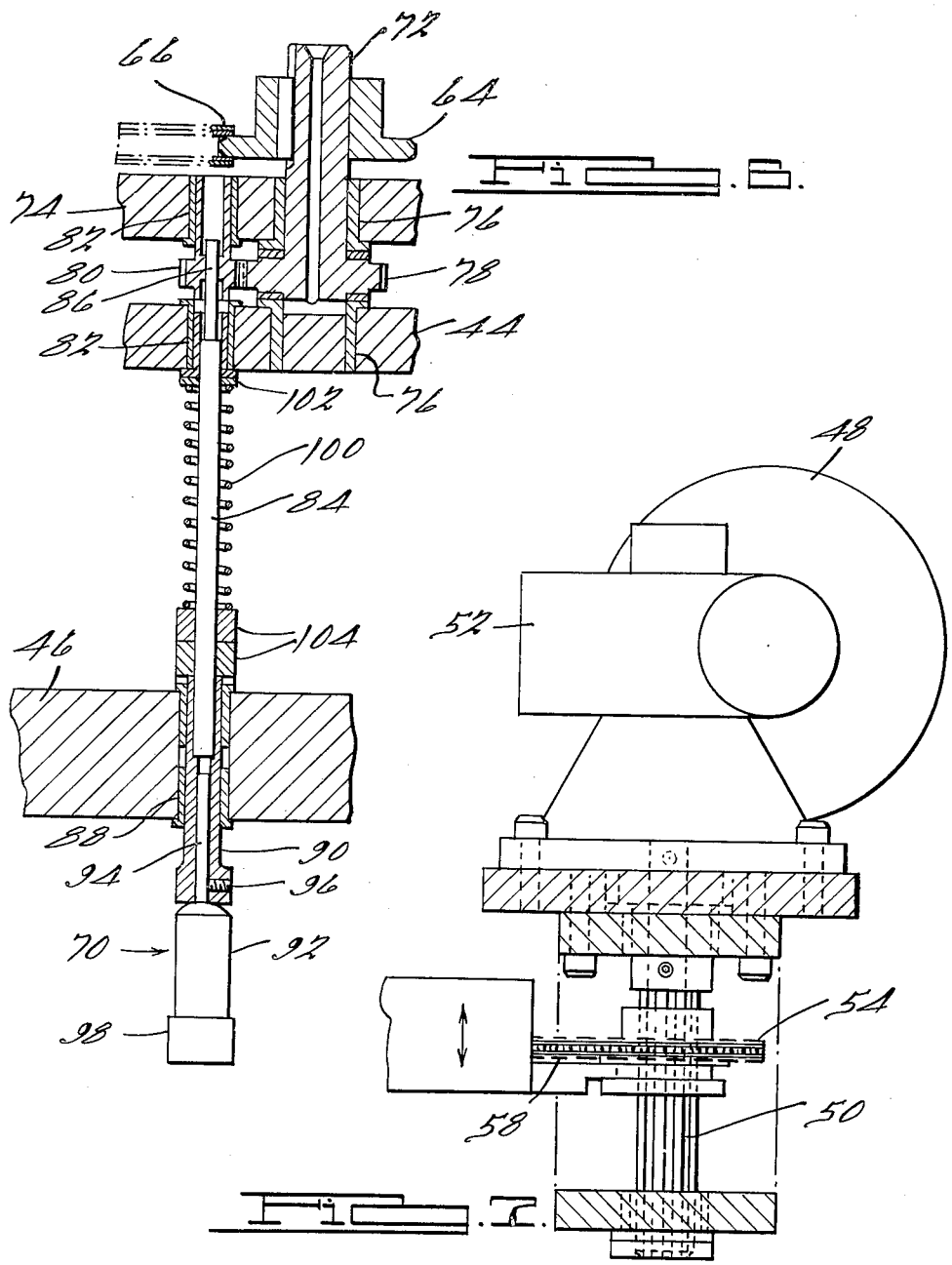

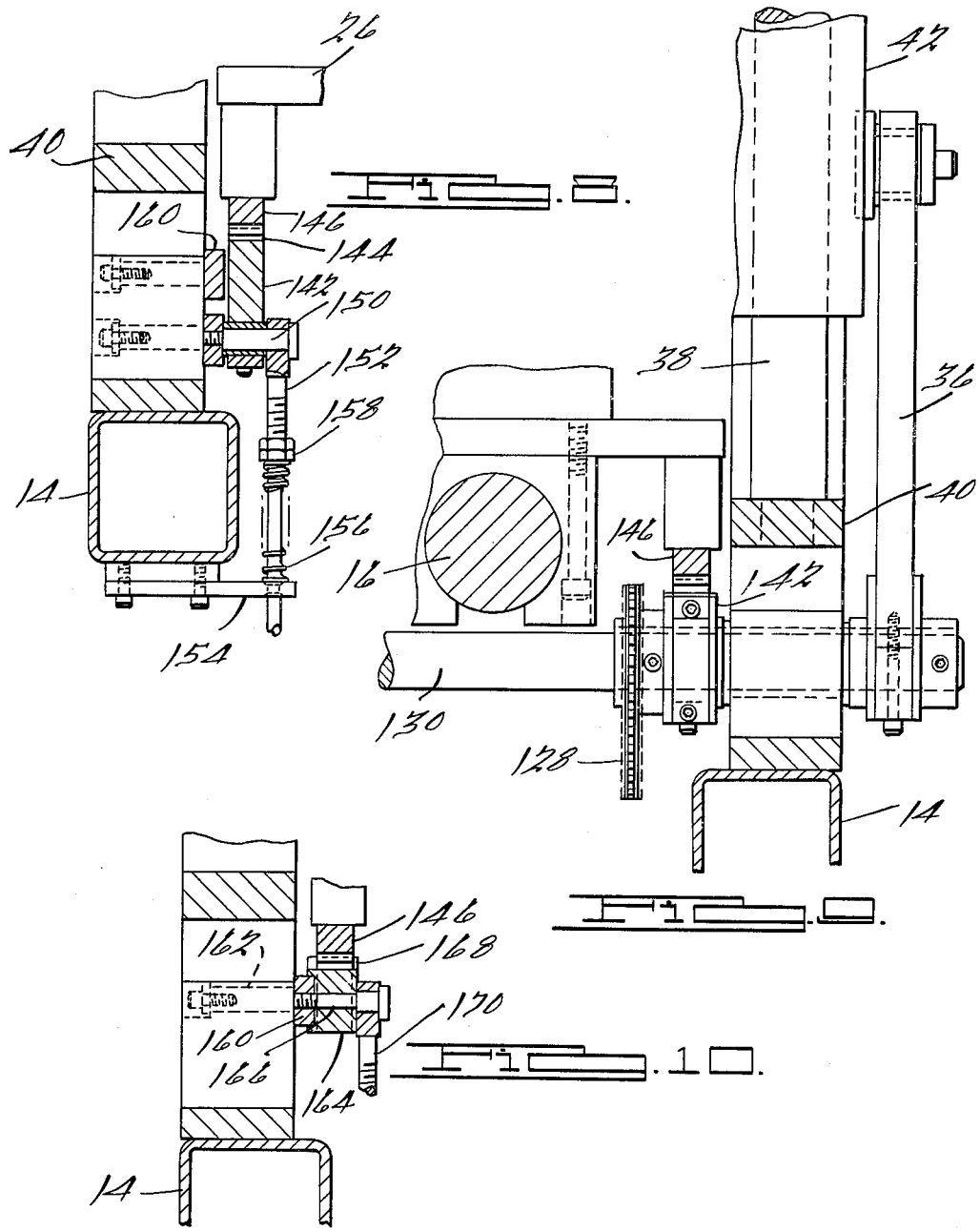

United States Patent Office 3,220,087
Patented Nov. 30, 1965

3,220,087
ENGINE TURNING MACHINE
Ralph L. Schwarz, Daytona Beach, Fla., assignor to Douglas & Lomason Company, Detroit, Mich., a corporation of Michigan
Filed Aug. 30, 1963, Ser. No. 306,413
6 Claims. (Cl. 29—90)

This invention relates to the art of placing a decorative finish or pattern on sheet metal by contacting the surface of the metal with a series of rotary spindles carrying discs of a material such as rubber, neoprene, or other suitable material. Each rotary disc places a circular pattern or imprint on the work and the patterns are generally placed in overlapping relation to provide an attractive finish or ornamental appearance to the surface of the metal. The technique of applying such a finish to sheet metal is frequently termed an engine turning operation and is well known in the art. However, such finishes have heretofore been applied by techniques not suitable for use on a mass production basis. The present invention provides a machine capable of producing an engine turn finish or pattern on sheet metal in mass production operations.

In general the machine forming the subject matter of this invention provides a means for automatically advancing the work a predetermined distance during each cycle of operation and contacting successive portions of the work with a series of constantly rotating spindles in timed relation to the movement of the work during each cycle of operation. More particularly, the invention contemplates a work supporting table and a vertically reciprocable tool head positioned above and extending transversely of the length of the table and a drive mechanism for indexing the table and the work supported thereon a predetermined distance forwardly and for effecting reciprocation of the tool head in timed relation to movement of the table during each cycle of operation so that the table is securely locked against movement just prior to and during the time that the rotary tools engage the work and is released for the succeeding increment of movement as the tool head is being raised from the work. The drive mechanism provides an accurate and positive drive means for the work supporting table and the tool head so as to provide accurate spacing of the successive engine turning patterns placed upon the work being processed and enables an engine turn pattern to be placed on a relatively large surface area or on several workpieces at the same time in a relatively short time so as to render the machine capable of producing parts having an engine turn finish thereon on a mass production scale.

A principal object of the invention is to provide a machine for producing an engine turn finish on sheet metal.

A further object of the invention is to provide a machine of the type described which is capable of producing an engine turn pattern on sheet metal on a mass production scale.

Another object of the invention is to provide a machine of the type described having a new and improved drive mechanism for accurately indexing the work in timed relation to reciprocation of the tool head carrying the rotary spindles which produce the desired ornamental pattern on the work.

Another object of the invention is to provide a machine of the type described which is automatic in operation and which is adapted to provide a wide variety of engine turn finishes on sheeet metal stock.

Other and further objects of the invention will be apparent from the following description and claims and may be understood by reference to the accompanying drawings, of which there are six sheets, which by way of illustration show a preferred embodiment of the invention and what I now consider to be the best mode of applying the principles thereof. Other embodiments of the invention may be used without departing from the scope of the present invention as set forth in the appended claims.

In the drawings:
FIG. 1 is a side elevational view of a machine embodying the present invention;
FIG. 2 is an end elevational view of the machine shown in FIG. 1;
FIG. 3 is a fragmentary top plan view with parts broken away;
FIG. 4 is an enlarged side elevational view of the drive mechanism of the work supporting table and the reciprocating tool head;
FIG. 5 is a sectional view taken on line 5—5 of FIG 3;
FIG. 6 is a sectional view taken on line 6—6 of FIG. 3;
FIG. 7 is a sectional view taken on line 7—7 of FIG. 3;
FIG. 8 is a sectional view taken on line 8—8 of FIG. 4;
FIG. 9 is a sectional view taken on line 9—9 of FIG. 4; and
FIG. 10 is a sectional view taken on line 10—10 of FIG. 4.

Referring to FIGS. 1, 2 and 3, the machine comprises a supporting base 10 which includes a series of vertical legs 12 and horizontally extending side frame members 14 secured thereto. A pair of guide rods 16 extend lengthwise of the machine and are mounted at spaced intervals on traverse frame members 18 by means of upwardly extending supporting blocks 20 having threaded extensions 22 threaded into the guide rods 16 so as to obtain accurate horizontal positioning of the guide rods 16.

A work supporting table 24 is mounted on a base plate 26 which has a series of guide blocks 28 secured on its under side. The guide blocks 28 are provided with keyways 30 slidably receiving the guide rods 16 so that the table 24 is adapted to slide longitudinally along the guide rods 16.

A vertically reciprocable tool head indicated generally at 32 is disposed above and extends transversely across the table 24 centrally of the machine. The supporting structure for the tool head 32 comprises upwardly extending frame members 34 at each side of the machine and a transversely extending frame member 36 secured to the upper ends of the frame members 34. A vertically extending stationary guide shaft 38 is mounted on a frame member 40 at each side of the machine and a trunnion 42 is slidably mounted on each of the guide shafts 38.

The tool head 32 extends between and is carried by the trunnions 42 and includes upper and lower horizontal transversely extending plates 44 and 46. A pair of electric motors 48 are mounted on the stationary frame member 36 and each motor is adapted to drive a vertically extending splined drive shaft 50 through a speed reduction unit 52. Each motor 48 is adapted to drive a group of rotary spindles through the chain and sprocket drive arrangement illustrated in FIGS. 3, 5, 6 and 7. A sprocket 54 is slidably mounted on each splined drive shaft 50 and drives a sprocket 56 mounted on the reciprocating tool head 32 through a chain 58. A second sprocket 60 is mounted on the shaft 62 on which the sprocket 56 is mounted and is adapted to drive a series of sprockets 64 by means of a chain 66. The sprockets 64 are arranged in pairs which are generally aligned in the longitudinal direction. A pair of idler sprockets 68 are provided for maintaining the desired tension on the chain 66.

Each longitudinally aligned pair of sprockets 64 is adapted to drive a group of four rotary tool spindles 70 extending between and supported at their opposite ends on the plates 44 and 46. Each sprocket 64 is keyed to a shaft 72 rotatably journaled in the plate 44 and a bearing plate 74 spaced above the plate 44 by means of bearings 76. Each of the sprocket shafts 72 carries a pinion 78 on its lower end in the space between the plates 44 and 74, and each of the pinions meshes with a pinion 80 rotatably journaled in the plates 44 and 74 by means of bearings 82. Each of the rotary tool spindles 70 comprises a spindle portion 84 having an upper end 86 of square cross section slidably received within a correspondingly shaped aperture in the pinion 80. The plate 46 is provided with bearings 88, each slidably receiving a sleeve 90 into which the lower end of the rotary spindle 84 extends. The engine turning tool 92 is provided with an upwardly extending pin 94 which is secured to the sleeve 90 by a set screw 96. A disc 98 of a suitable material, such as hard rubber or neoprene, is secured on the lower end of the tool 92 so as to be rotated with the rotary spindle 84. A spring 100 is confined between a washer 102 engaging the under side of the bearing plate 44 and a pair of washers 104, the lower of which engages the upped end of the sleeve 90.

The number and arrangement of the rotary tool spindles 70 obviously may be varied as desired to provide an engine turning pattern on the work of any desired width and of any desired spacing between the successive circular patterns or imprints that are placed upon the work by each of the rotary spindles. In the embodiment of the invention illustrated herein the spindle arrangement is designed to effect an engine turning pattern on six workpieces 110 at the same time. The workpieces which consist of elongated strips of sheet metal are disposed lengthwise on the work supporting table 24 and may be clamped to the table if desired, or merely located at their opposite ends by locating blocks 112 secured to opposite ends of the table. Each workpiece is adapted to be contacted by one of the six groups of four rotary tool spindles, as illustrated in FIG. 3.

The drive mechanism for indexing the work supporting table 24 in the longitudinal direction and for effecting vertical reciprocation of the tool head comprises an electric motor 114 mounted on a platform 116 supported by a transverse frame member 118. The motor 114 drives a speed reducer 120 through a chain or belt 122. The output shaft 124 of the speed reduction unit 120 carries a sprocket 126, and a sprocket 128 is secured on a transversely extending drive shaft 130 which is disposed below the table 24 and journaled at its opposite ends in suitable bearings supported by the stationary frame of the machine. Chain 132 engages the sprockets 126 and 128 to drive the shaft 130. The shaft 130 is provided with an eccentric 134 at its opposite ends and a crank arm 136 is mounted on each of the eccentrics 134 and is rotatably mounted at its upper end on a stub shaft 138 extending from the adjacent trunnion 42 so that the tool head 32 is reciprocated vertically on the guide shafts 38 once during each revolution of the drive shaft 130.

A second eccentric 140 is mounted on the drive shaft 130 adjacent one end thereof inwardly of the eccentric 134. An indexing dog 142 is rotatably mounted on the eccentric 140 and carries an upwardly extending tooth 144 which is engageable with a toothed rack 146 which is secured to the under side of the work supporting table 24 and extends lengthwise of the table at one side thereof. The indexing dog is provided with a rectangular slot 148 into which extends a pin 150 mounted on the upper end of a rod 152 which is slidably supported within a plate 154 secured to one of the longitudinal frame members 14. A spring 156 is confined between the plate 154 and a nut 158 secured on the rod 152 so as to urge the rod 152 upwardly and thereby urge the tooth 144 on the indexing dog 142 into engagement with the teeth of the rack 146.

An arm 160 is pivotally mounted at one end on a pin 162 extending from the stationary framework of the machine and at its outer end carries a temporary holding dog 164 which is pivotally mounted on the arm 160 by a pin 166. The dog 164 is provided with a tooth 168 which is engageable with the teeth of the rack 146. A rod 170 is pivoted at its upper end on the pin 166 and is vertically slidable through the plate 154. A spring 172 confined between the plate 154 and a nut 174 on the rod 170 urges the dog 164 upwardly into engagement with the rack 146.

As the drive shaft 130 rotates, the indexing dog 142 will oscillate since it is mounted on the eccentric 140 and its outer end is urged upwardly by the spring 156. The oscillating movement of the indexing dog 142 will cause the tooth 144 to successively engage the teeth of the rack 146 to index the table 24 forwardly a distance corresponding to the spacing of the rack teeth once during each revolution of the drive shaft 130. As the table is indexed forwardly the temporary holding dog 164 is retracted due to the inclined rearward slope of the tooth 168 and will be snapped upwardly into engagement with the succeeding tooth as soon as the indexing dog drives the table forwardly as the indexing dog oscillates.

A rack 176 having upwardly facing teeth 178 is secured to the table 24 at each side thereof and extends longitudinally of the table. Each of the trunnions 42 is provided with a bore 180 slidably receiving a locking dog 182 having teeth 184 engageable with the teeth 178 on the adjacent rack 176. Each of the locking dogs 182 is provided with an elongated slot 186 through which a pin 188 extends to limit movement of the locking dog relative to the trunnion 42 in which it is slidably mounted. A spring 190 is confined between the upper end of the bore 180 and the locking dog 182 so as to urge the latter downwardly. As the tool head 32 is lowered, the teeth 184 on the locking dog 180 engage the teeth 178 on the rack 176 to positively lock the work suporting table 24 against movement and to accurately position the table relative to the rotary tool spindles so that the engine turning pattern will be accurately spaced from the pattern imposed on the previous cycle of operation. The eccentrics 134 and 140 which respectively drive the tool head 32 and the work supporting table 24 are angularly offset from each other so that during each cycle of operation the tool head is raised from the work while the indexing dog 142 is driving the table forwardly. As soon as the oscillation of the indexing dog moves the table forwardly a distance corresponding to the spacing of the teeth on the rack 146, the temporary holding dog 164 engages the succeeding tooth to hold the table against further movement such as might occur due to the momentum of the table after the indexing dog begins to move backwardly for engagement with the next tooth. As the tool head is lowered, the positive locking dogs 182 engage the racks 176 and positively lock the table and accurately position it just prior to and during the time that the rotary spindles engage the work to perform the engine turning operation. Thus the drive mechanism disclosed herein provides a cooperation between the movement of the work supporting table and the tool head which insures that the spacing of the successive engine turn patterns placed on the work will be extremely accurate. It will be apparent that even though the spacing between successive rack teeth is not maintained exactly constant, the machine described will place the exact number of engine turn patterns on the work per unit of length for which the machine is designed.

When the work supporting table 24 reaches the end of its travel and the desired pattern has been produced on the entire length of the work, the indexing dog 142 and the holding dog 146 may be retracted from engagement with the rack 146 to enable the operator to slide the table rearwardly along the guide rods 16 to the starting position. Referring to FIG. 4, a manually operable lever 192 is pivoted to the frame member 14 on a pin 194 and is pivotally connected to a rod 196 connected at its opposite end to a link 198 which in turn is connected to a block 200 secured on a plate 202 through which the lower ends of the rods 152 and 170 extend. As the lever 192 is rotated, the rods 152 and 170 will be retracted to disengage the indexing and holding dogs from the rack 146, thereby allowing the table to be moved rearwardly.

A pair of blocks 204 are mounted at the opposite ends of the plate 44 on the tool head and are engaged by threaded adjusting screws 206 by means of which the supporting plates 44 and 46 which carry the rotary tool spindles may be adjusted to insure parallelism between the tool head and the work supporting table so that each of the rotary spindles will engage the work with the same pressure. The rotary spindles are retracted upwardly relative to the tool head as soon as the work is engaged by the discs 98 since the discs engage the work prior to the bottom of the stroke of the tool head.

It will be apparent that the present machine is adapted to produce an engine turn pattern on workpieces of any desired width or length and that by using a smaller or larger number of rotary spindles in each group of spindles, a pattern of any desired width may be produced. When it is desired to place a pattern of narrower width than the width of the stock and having a relatively sharp line of demarcation at its opposite sides as shown in FIG. 3, the stock may first be provided with a suitable coating or resist to delineate the areas on which the pattern will be produced, and the resist may thereafter be washed off.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. In an engine turning machine, a horizontally movable work supporting table, a vertically reciprocable tool head positioned above and straddling said table and the work thereon, a plurality of rotary tool spindles reciprocably mounted on said tool head and engageable with the work effecting an engine turning pattern thereon, drive means for said table and said tool head for indexing said table forwardly a predetermined distance and for effecting reciprocation of said tool head in timed relation to said movement of said table during each cycle of operation, said drive means comprising a drive shaft disposed beneath and extending transversely of said table, an eccentric on said drive shaft, a crank arm connecting said eccentric and said tool head for reciprocating the latter during each revolution of said drive shaft, a toothed rack secured to and extending lengthwise of the table, a second eccentric on said drive shaft, an indexing dog mounted on said eccentric so as to be oscillated once during each shaft revolution, a tooth on said indexing dog engageable with said rack for driving said table forwardly during each cycle of operation, spring means urging said indexing dog into engagement with said rack, a holding dog having a tooth engageable with said rack teeth for limiting each increment of forward movement of said table to a distance equal to the spacing between said rack teeth and for holding said table against movement while said indexing dog is disengaged from said rack teeth, a second toothed rack secured to and extending lengthwise of said table, a locking dog reciprocably mounted on said tool head and engageable with said second rack for positively positioning said table prior to and during engagement of said spindles with the work, said eccentrics being angularly offset relative to each other so as to effect driving engagement of said indexing dog with its rack while said tool head is being raised and engagement of said locking dog with said second rack and engagement of said spindles with the work while said indexing dog is moving rearwardly for engagement with the succeeding rack tooth.

2. In an engine turning machine, a horizontally movable work supporting table, a vertically reciprocable tool head positioned above and straddling said table and the work thereon, a plurality of rotary tool spindles reciprocably mounted on said tool head and engageable with the work for effecting an engine turning pattern thereon, drive means for said table and said tool head for indexing said table forwardly a predetermined distance and for effecting reciprocation of said tool head in timed relation to said movement of said table during each cycle of operation, said drive means comprising a drive shaft disposed beneath and extending transversely of said table, an eccentric on opposite ends of said drive shaft, crank arms connecting said eccentrics and said tool head for reciprocating the latter during each revolution of said drive shaft, a toothed rack secured to and extending lengthwise of the table, a second eccentric on said drive shaft angularly offset from said first-mentioned eccentrics, an indexing dog mounted on said second eccentric so as to be oscillated once during each shaft revolution, a tooth on said indexing dog engageable with said rack for driving said table forwardly a distance corresponding to the spacing of said rack teeth during each cycle of operation, spring means urging said indexing dog into engagement with said rack, a vertically reciprocable holding dog having a tooth engageable with said rack teeth for limiting each increment of forward movement of said table to a distance equal to the spacing between said rack teeth and for holding said table against movement while said indexing dog is disengaged from said rack teeth, a second toothed rack secured to and extending lengthwise of said table, a locking dog reciprocably mounted on said tool head and engageable with said second rack for positively positioning said table relative to said tool head prior to and during engagement of said spindles with the work, said eccentrics being disposed relative to each other so as to effect driving engagement of said indexing dog with its rack while said tool head is raised from the work and engagement of said locking dog with said second rack and engagement of said spindles with the work while said indexing dog is moving rearwardly for engagement with the succeeding rack tooth.

3. In an engine turning machine, a horizontally movable work supporting table, a vertically reciprocable tool head positioned above and straddling said table and the work thereon, a plurality of rotary tool spindles reciprocably mounted on said tool head and engageable with the work for effecting an engine turning pattern thereon, drive means for said table and said tool head for indexing said table forwardly a predetermined distance and for effecting reciprocation of said tool head in timed relation to said movement of said table during each cycle of operation, said drive means comprising a crankshaft extending transversely of said table, a crank arm connecting said crankshaft and said tool head for reciprocating the latter during each revolution of said crankshaft, a toothed rack secured to and extending lengthwise of the table, an indexing dog mounted on said crankshaft so as to be oscillated once during each shaft revolution, a tooth on said indexing dog engageable with said rack for driving said table forwardly during each cycle of operation, spring means urging said indexing dog into engagement with said rack, a holding dog having a tooth engageable with said rack teeth for limiting each increment of forward movement of said table to a distance equal to the spacing between said rack teeth and for holding said table against movement while said indexing dog is disengaged from said rack teeth, a second toothed rack secured to and extending lengthwise of said table, a locking dog reciprocably mounted on said tool head and engageable with said second rack for positively positioning said table relative to said tool head prior to and during engagement of said spindles with the work, said crank arm and said indexing dog being mounted on angularly offset crank portions of said crankshaft so as to effect driving engagement of said indexing dog with its rack while said tool head is raised from the work and engagement of said locking dog with said second rack and engagement of said spindles with the work while said indexing dog is moving rearwardly for engagement with the succeeding rack tooth.

4. In an engine turning machine, a horizontally movable work supporting table, a vertically reciprocable tool head positioned above said table and the work thereon, a plurality of rotary tool spindles reciprocably mounted on said tool head and engageable with the work for effecting an engine turning pattern thereon, drive means for said table and said tool head for indexing said table forwardly a predetermined distance and for effecting reciprocation of said tool head in timed relation to said movement of said table during each cycle of operation, said drive means comprising a drive shaft, an eccentric on said drive shaft, a crank arm connecting said eccentric and said tool head for reciprocating the latter during each revolution of said drive shaft, a toothed rack secured to and extending lengthwise of the table, a second eccentric on said drive shaft, an indexing dog mounted on said second eccentric so as to be oscillated once during each shaft revolution, a tooth on said indexing dog engageable with said rack for driving said table forwardly a distance corresponding to the spacing of said rack teeth during each cycle of operation, a second toothed rack secured to and extending lengthwise of said table, and a locking dog reciprocably mounted on said tool head and engageable with said second rack for positively positioning said table prior to and during engagement of said spindles with the work, said eccentrics being angularly offset relative to each other so as to effect driving engagement of said indexing dog with its rack while said tool head is being raised and engagement of said locking dog with said second rack and engagement of said spindles with the work while said indexing dog is moving rearwardly for engagement with the succeeding rack tooth.

5. A machine according to claim 4 including spring means urging said indexing dog into engagement with said first-mentioned rack.

6. A machine according to claim 5 including a holding dog engageable with one of said racks for holding said table against movement at the completion of the driving stroke of said indexing dog.

References Cited by the Examiner
UNITED STATES PATENTS
1,792,829   2/1931   Goin _____ 29—90

RICHARD H. EANES, JR., *Primary Examiner.*